(12) United States Patent
Brocke et al.

(10) Patent No.: US 6,182,009 B1
(45) Date of Patent: *Jan. 30, 2001

(54) METHOD FOR DETERMINING ROUTE DATA

(75) Inventors: Karl Brocke, Ludwigsburg; Stefan Harrer, Esslingen, both of (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/089,115

(22) Filed: Jun. 2, 1998

(30) Foreign Application Priority Data

Jun. 10, 1997 (DE) .............................. 197 24 407

(51) Int. Cl.$^7$ .............................. G01C 21/00; G06G 7/78
(52) U.S. Cl. .................... 701/209; 701/210; 701/213; 701/214; 701/216; 340/991; 340/994
(58) Field of Search ................................. 701/209, 207, 701/208, 210, 211, 213, 117, 118, 216, 215, 214; 340/994, 990, 995, 998, 989, 991; 342/456, 457

(56) References Cited

U.S. PATENT DOCUMENTS

| | | | |
|---|---|---|---|
| 5,257,195 | * | 10/1993 | Hirata ..................................... 701/216 |
| 5,323,152 | * | 6/1994 | Morita ................................... 340/988 |
| 5,345,382 | * | 9/1994 | Kao ....................................... 701/224 |
| 5,440,484 | * | 8/1995 | Kao ....................................... 701/224 |
| 5,602,739 | * | 2/1997 | Haagenstad et al. ................ 701/225 |
| 5,805,079 | * | 9/1998 | Lemelson ......................... 340/870.05 |
| 5,808,565 | * | 9/1998 | Matta et al. .......................... 701/213 |
| 5,875,412 | * | 2/1999 | Sulich et al. ......................... 701/207 |

FOREIGN PATENT DOCUMENTS

| | | |
|---|---|---|
| 3905602 | 8/1989 | (DE) . |
| 3908702 | 12/1989 | (DE) . |
| 3912108 | 10/1990 | (DE) . |
| 4326237 | 12/1994 | (DE) . |
| 4415993 | 11/1995 | (DE) . |
| 4423328 | 1/1996 | (DE) . |
| 19525291 | 12/1996 | (DE) . |
| 19526148 | 2/1997 | (DE) . |
| 19539308 | 4/1997 | (DE) . |
| 19539641 | 4/1997 | (DE) . |
| 19544158 | 5/1997 | (DE) . |
| 19608538 | 5/1997 | (DE) . |
| 9635197 | 11/1996 | (WO) . |

OTHER PUBLICATIONS

"Bundelfunk–System fur Verkehrsbetriebe" In: ntz, Bd. 47, 1994, H.6., pp. 400–407 by Schutte and Bachmann.

* cited by examiner

Primary Examiner—Jacques H. Louis-Jacques
(74) Attorney, Agent, or Firm—Ware, Fressola, Van Der Sluys & Adolphson LLP

(57) ABSTRACT

A method for determining route data, in particular geographical coordinates (P1, P2 ... Px, Px$_1$ ... Pn) and route distances (S1, S2 ... Sx$_1$ ... S$_{n-1}$) for frequently traveled routes, wherein position data of a vehicle along a route are measured both with an external route transmitter and with an internal route transmitter. To reduce margins of error of the route data, the externally and internally measured position data of several trips and/or vehicles are compared with each other for characteristic points along the route, in particular stops (P1, P2 ... Px, Px$_1$ ... Pn), and statistically evaluated, and the evaluated data are provided to the internal route transmitter as route data.

6 Claims, 2 Drawing Sheets

METHOD FOR DETERMINING ROUTE DATA

TECHNICAL FIELD

The invention relates to a method of determining route data in particular geographical coordinates and route distances for routes to be traveled frequently, wherein position data of a vehicle along a route are measured both with an external route transmitter and with an internal route transmitter.

BACKGROUND OF THE INVENTION

A smooth operation of the OPNV (Local Public Transit System) requires precise route data for the routes to be traveled. For example, the activation points for remotely triggering traffic signals (LSA telegrams—i.e. data communiucations) in order to preferentially switch traffic signals (LSA) have to be reproducible with a tolerance of +/−5 m. Consequently, the wireless control of traffic signals—"green wave" for buses—works properly only if the internal route transmitter generates an activation signal for the LSA telegram within a radius of +/−5 m. Conventional internal and external route transmitters generally do not meet these requirements. Only measurements relying on radio beacons with a known location would allow a sufficiently accurate determination of distances along a route. However, this method would require closely spaced radio beacons, making installation and maintenance expensive and quite complex.

Especially the activation points and the stops are therefore in general measured geodetically. However, it is quite expensive and labor-intensive to obtain such data and to input these data in the internal route transmitters of each individual vehicle. It is also disadvantageous that each change in the route system, including planned detours, requires expensive modifications because new measurements have to be performed and the data representing the changes have to be entered.

SUMMARY OF THE INVENTION

It is therefore an object of the invention to provide a method of the aforedescribed type which enables an accurate determination of the route data.

This object is solved by a method for determining route data, in particular geographical coordinates and route distances for routes to be traveled frequently, wherein position data of a vehicle along a route are measured both with an external route transmitter and with an internal route transmitter, wherein the externally and internally measured position data of several trips and/or vehicles are compared with each other for characteristic points of the route, in particular stops, and statistically evaluated, and that the evaluated data are provided to the internal route transmitter as route data. Systematic deviations can be checked by repeatedly comparing the internally and externally determined coordinates, so that the internal route transmitter can be adjusted. Once a sufficiently large number of measurements have been performed and by taking into account qualitative boundary conditions and plausibility checks to avoid erroneous interpretations, the statistical data which almost represent the corrected data, are supplied to the internal route transmitters as route data.

Route changes can then be continuously integrated into the traffic management. The system is initially operated in statistical mode, wherein the data of the changed route segment are measured and statistically evaluated. The traffic does not have to be interrupted and no manual measurements of the new route segment are required. After the operation in statistical mode is concluded and the internal route transmitter have been adjusted, the internal route transmitter can now reproduce all activation points along the new route segment with sufficient accuracy.

The method is preferably employed with the OPNV by using the DGPS (Differential Global Positioning System) and an RBL (Computerized Operations Management System). However, the method can also be used for freight traffic, in the private sector, on highways and in vehicles of various types.

The calibration process can be largely automated, providing a seamless transition between operation in statistical mode and normal operation if the measured position data are transmitted via a wireless LAN to an RBL center for off-line evaluation and that the route data are provided to the RBL on-board computer (3) via a data download.

Precise route data are particularly important so that traffic signals can be preferentially switched. Most importantly, the on-board RBL device here automatically generates an LSA (Traffic Light Signal) data communication at the optimum activation point +/−5 m. This accuracy can only be attained if the route data of the stops are determined with an error of no greater than +/−1 m. The statistical evaluation process can satisfy this requirement, if the coordinates of individual stops are measured with an accuracy of approximately +/−5 m and if the route segments between the stops are determined with an accuracy of approximately +/−5%.

BRIEF DESCRIPTION OF THE DRAWINGS

The invention is described hereinafter with reference to schematically illustrated embodiments. It is shown in.

BEST MODE FOR CARRYING OUT THE INVENTION

Figure 1:
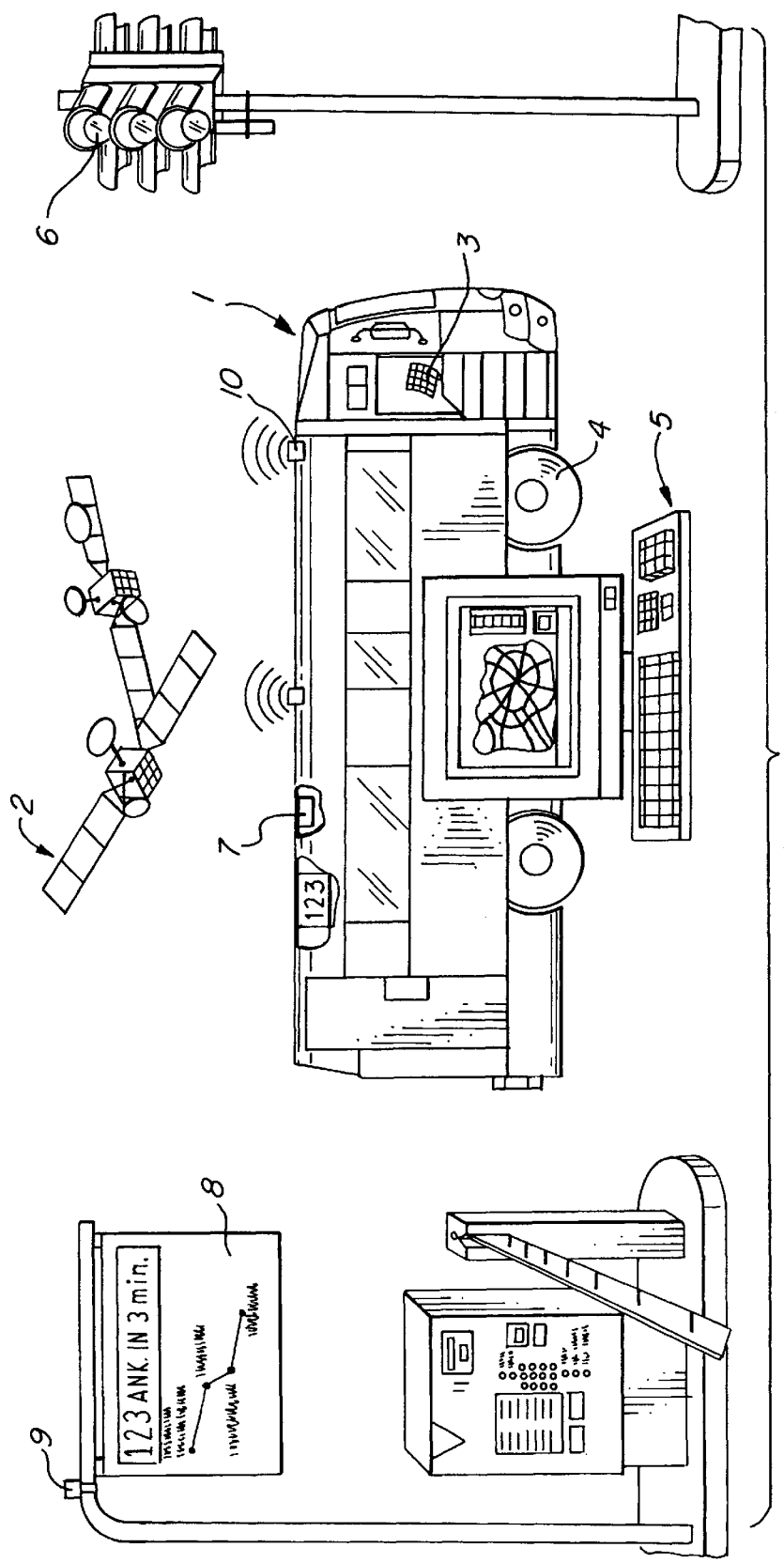
FIG. 1, an overview of the important system components.

Accurate route data of a bus 1 which runs according to a schedule along a certain route, are determined by measuring certain points, in particular stops P1, P2 ... Px ... Pn/FIGS. 2 and 3, both with a DGPS (Differential Global Positioning System) 2 and also with an on-board RBL computer 3 (Computerized Operation Management System). The on-board RBL computer 3 can cooperate, for example, with an odometer which measures the number of revolutions of the wheels representing the distance traveled. The DGPS and RBL measurements are compared with each other and statistically evaluated. After a sufficiently large number of measurements for each stop of a route segment, both the exact coordinates P1, P2 ... Px ... Pn of the stops as well as the distances S1, S2 ... Sn-$_1$, between two stops can be determined. The required number of measurements can be reached more quickly by combining the results from all buses 1 traveling along an identical route. For this purpose, the measurement data of all respective buses 1 are transmitted daily via wireless LAN to a center 5 of the RBL for off-line evaluation. As soon as the collected data satisfy appropriate stability criteria with respect to the variance of the results during off-line evaluation, these data are downloaded again to the individual on-board RBL computers 3 of the buses 1. The on-board RBL computer 3 is then able to generate a wireless data communication in that route segment $\Delta Px_1$/FIG. 3 in which the wireless data communication is also able to reach a receiver of an LSA 6 (Traffic Light System). The wireless data communication activates a preferential switching of the LSA. Buses 1, in particular buses of the OPNV (Local Public Transit System), thereby receive preferential treatment, similar to the "green wave". Moreover, the rather precise position data of the on-board RBL computer 3 can be used inside the buses 1 to control optical and/or acoustical signaling at the stops 7 and also to control the display to display arrival messages 8 before the bus 11 reaches respective stops 11/FIG. 3. The arrival message display 8 is here equipped with a receiver 9, whereas the on-board RBL computer 3 is connected to a corresponding transmitter 10. Depending on the actual position of the bus 1, passengers sometimes must wait a certain time at the individual stops 11 for the bus 1 to arrive/FIG. 3. The projected waiting time can be displayed, e.g., as "Arrival in XX Minutes".

Figure 2:
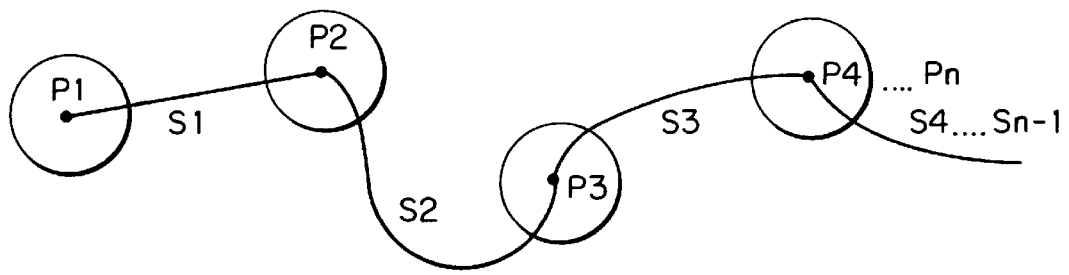
FIG. 2, a schematic illustration of the measurement points.
Figure 3:
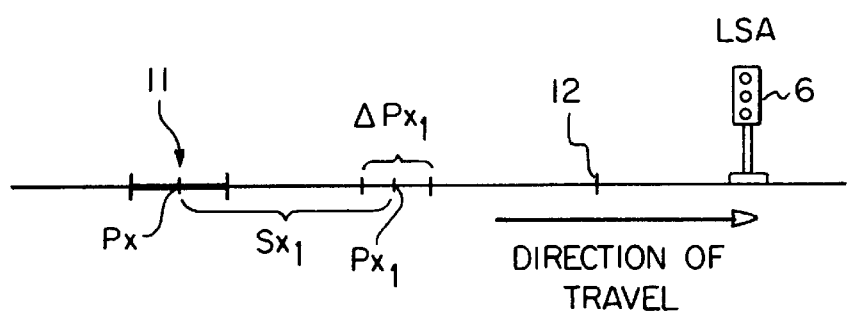
FIG. 3, schematically, an application.

FIG. 2 illustrates a route consisting of the segments S1, S2 ... $S_{n-1}$ between the stops P1, P2 ... Pn. The exact coordinates for the stops P1, P2 ... Pn are determined according to the comparative measurements and the statistical evaluation process described above. The exact lengths of the segments S1, S2 ... $S_{n-1}$ can then be determined from these coordinates and from the odometrically determined distances. These data form the basis for determining exact activation points. One of these activation points representing an exemplary activation point for a LSA data communication is indicated in FIG. 3 as $Px_1$. Px it designates one of the n stops 11 and $Sx_1$ the distance between this stop 11 and the activation point $Px_1$. Because the tolerance of the point $Px_1$ is ½ $\Delta Px_1$=ca. +/−5 m, the point $Px_1$ is ideally suited for activating the LSA data communication to preferentially switch the traffic light 6. The LSA-internal switching time can be programmed so that the bus 1, when in a normal traffic flow, is not forced to stop at a stop line 12 before the traffic light 6.

The invention is not restricted to the aforedescribed embodiment. Rather, a number of variations of the described embodiment are possible without departing from the spirit of the invention.

What is claimed is:

1. A method for determining a vehicle route, the vehicle route being defined by vehicle route data including position data (P1, P2 ... Px, $Px_1$ ... Pn) indicating stops along the vehicle route, the method comprising the steps of:
    (a) measuring the position data for several trips of the vehicle along the route both with an external route transmitter and with an internal route transmitter;
    (b) comparing the externally and internally measured position data for the several trips of the vehicle with each other for particular stops (P1, P2 ... Px, $Px_1$ ... Pn);
    (c) statistically evaluating the measured position data based on the result of the comparison of the externally and internally measured positions data so as to determine the position data to within an allowed margin of error; and
    (d) providing as the position data of the vehicle route, the statistically evaluated measured position data and providing the vehicle route to the internal route transmitter.

2. The method of claim 1, wherein the external route transmitter is a DGPS (Differential Global Positioning System) (2) and the internal route transmitter is an "RBL" on-board computer (Computerized Operations Management System) (3), and further wherein vehicles of the OPNV (Local Public Transit System) are equipped with the on-board computers (3).

3. The method of claim 2, wherein the measured position data are transmitted via a wireless LAN to an RBL center (5) for off-line evaluation and the route data are provided to the RBL on-board computer (3) via a data download.

4. The method of claim 3, wherein the route data also indicates activation points ($Px_1$), such as for triggering "LSA" (Light Signal System (6)) data communications for preferential switching of traffic signals (LSA (6)).

5. The method of claim 4, wherein the activation points ($Px_1$) are determined from the position data (Px) of the stops (11) and the route distances ($Sx_1$) to the respective closest neighboring stop (11).

6. The method of claim 2, wherein the route data also indicates activation points ($Px_1$), such as for triggering "LSA" (Light Signal System (6)) data communications for preferential switching of traffic signals (LSA (6)).

* * * * *